UNITED STATES PATENT OFFICE.

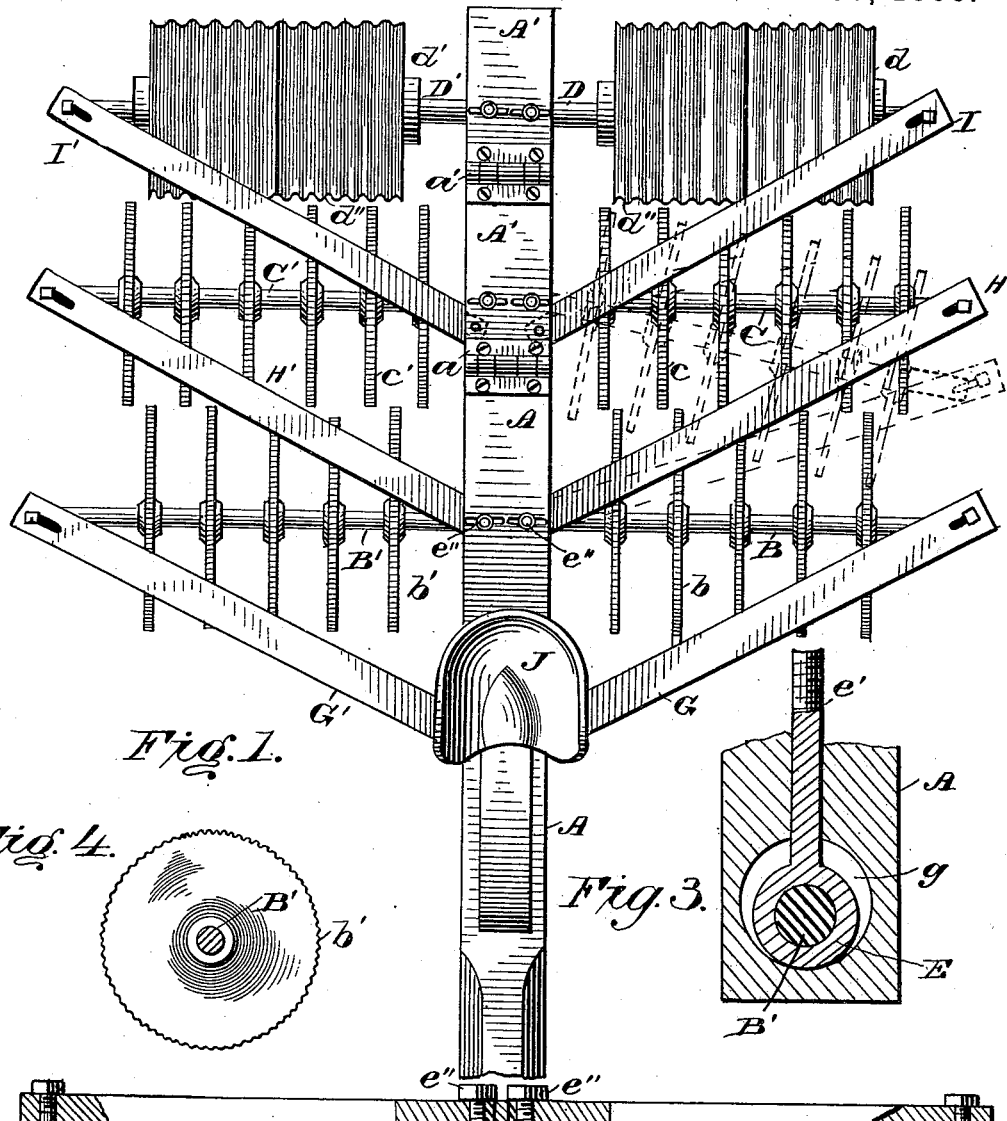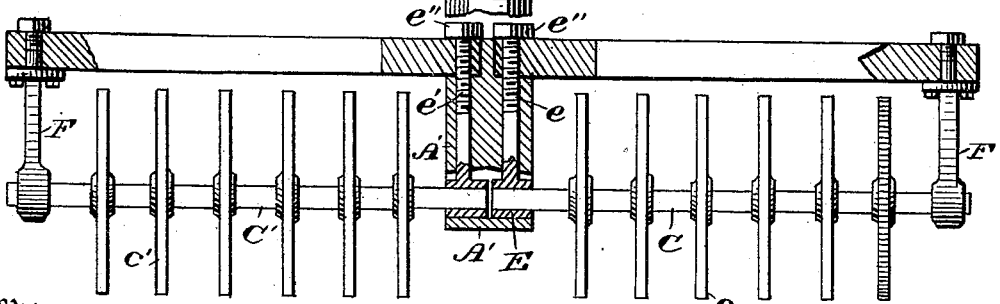

JOHN D. SCHIBLI, OF LITTLE ROCK, ARKANSAS.

REVOLVING HARROW.

SPECIFICATION forming part of Letters Patent No. 353,597, dated November 30, 1886.

Application filed July 15, 1886. Serial No. 203,078. (No model.)

*To all whom it may concern:*

Be it known that I, JOHN D. SCHIBLI, of Little Rock, in the county of Pulaski and State of Arkansas, have invented certain new and useful Improvements in Revolving Harrows; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to harrows, and has for its object to provide a machine of this class which will more effectually pulverize the surface of the soil than heretofore, rendering it in a much better condition for cultivation.

It consists in certain details of construction, combination, and arrangement of parts, which I shall now proceed to fully describe, and the particular points of novelty in which will be specifically designated in the claims hereto appended.

Referring to the accompanying drawings, Figure 1 is a top plan view of my improvement complete. Fig. 2 is a vertical transverse section on line $xx$, Fig. 1. Fig. 3 is a detail section showing the manner of mounting the ends of the roller-shafts. Fig. 4 is a view in end elevation of one of the pulverizing-rollers. Fig. 5 is a detail view, showing in section another mode of pivoting the cross-bars to the main frame than that shown in Fig. 2.

Referring to the drawings, like letters of reference mark the same parts in all the figures thereof.

A is the main beam, having the extensions A' A'', hinged thereto at the points $a a'$, the object of which construction will be hereinafter explained.

B B', C C', and D D' are the roller-shafts, mounted at their inner ends in the bearings E E, secured in the central beam, A, and its extensions A' A'', and at their outer ends in the depending arms F F, reaching from the cross-bars G G', H H', and I I', and carrying, respectively, the rollers $b b'$, $c c'$, and $d d'$.

The bearings E E in the main frame or beams A A' A'' consist of bolts $e e'$, having nuts $e''$, fitting on their screw-threaded ends upon the top surface of beams A A' A''. These bolts $e$ $e'$ terminate at their lower ends in depending boxes, as shown in Figs. 2 and 3, for the reception of the ends of the roller-shafts. The outer bearings consist of the depending arms F F, secured by nuts on their ends in slots in the ends of the cross-bars, and also terminating in boxes $f f'$, for the outer ends of roller-shafts, the said bearings being of similar construction to those of the main frame, with the exception that the depending arms are provided with openings $g$, sufficiently large to allow the bearing-boxes $f$ $f'$ to turn, or to permit a vertical movement therein. The ends of the shafts being pivotally mounted at their ends in the bearings E and F, they can be adjusted at different angles to the main beam by loosening and again tightening the nuts on the ends of the bolts $e'$ and F.

The cross-bars G G' H H' I I' are pivotally secured to the main beams, either by the same bolts that serve to hold the bearings E E, or by the separate bolts shown in Fig. 5, the object being to permit them to be adjusted at different angles to the said main beams.

The rollers $b b' c c' d d'$ are mounted on the shafts B B' C C' D D' at regular intervals apart, and are substantially disks in form, the series $c c'$ alternating in position on its respective shafts with relation to the series $b b'$ on shafts B B', the object being to arrange the back series to cover the ground omitted in between the rollers $b b'$. The edges of these rollers are made serrated, causing them to more finely pulverize the broken soil over which they pass while in operation.

The peripheries of rolls $d d'$ are provided with circumferential grooves $d''$, forming a series of ribs upon said surface, the object of which is to roll the ground previously pulverized by the series of forward rollers, leaving a series of small trenches, which will serve as receptacles for water, preventing it from running off, and thereby causing more absorption of moisture to the earth.

As the roller-shafts and cross-bars are pivotally secured to the main beams, and the said shafts are in turn secured to the cross-bars at their outer ends, as before described, both can be operated at different angles to the main beam by loosening the nuts $e'' e''$ on the ends of the bolts $e' e'$ and arms F F, which allows the inner end of the shaft to turn in its bearing and the outer end to move in the bearings of arms F F, which arms are free to move in the slots in each extremity of the cross-bars, thus allowing the shafts and cross-bars to be adjusted at the desired angle, as shown in dotted lines, Fig. 1, thereby enabling the operator to more finely pulverize the soil than when at right angles, as shown in full lines, Fig. 1. The serrations on the rollers might be substituted by teeth, if desired, being beneficial in breaking up clods of earth left by the plow and finely pulverizing it; also, the rolls $d$ $d'$ might be provided with longitudinal grooves at right angles to the grooves shown, at proper distances apart, the object being to leave both a longitudinal and transverse series of trenches in the wake of the machine.

J is a seat for the driver, being of any desirable construction, and the machine is provided with suitable tongue or shafts.

It is obvious that as many pairs of roller-shafts and rolls might be used as desired, and could be varied in size and weight—for example, the first series being, say, eighteen inches, the second sixteen, and, the third fourteen inches in diameter; also, the width of the harrow proper may vary from six to fourteen feet, (more or less,) as occasion may demand, without departing from the spirit of my invention.

The object of hinging the extensions A' A'' to the main beam is to allow the rear series to be turned over on top of the forward part of the machine, either for the purpose of increasing the weight forward or to be out of the way when not desirable to use. Another advantage of this construction is that when the machine is passing over rough or hilly ground the rolls being loosely hinged they will move more freely over obstructions of any sort than when rigidly attached.

Having thus fully described my invention, what I claim as new, and desire to secure by Letters Patent, is—

1. In a harrow, a main beam having hinged extensions, in combination with shafts and cross-bars pivotally secured thereto, said shafts being pivoted to the main beam and extensions at one end and to the outer ends of cross-bars at the other end, and carrying series of alternating disks or rollers, as set forth.

2. In combination, the main beam A, slotted cross-bars G G', shafts B B', rolls $b$ $b'$, and the bearing for the shafts formed as an eye-bolt, in the manner set forth.

3. In a harrow, the combination, with a longitudinal beam and its hinged extensions, of a series of sidewise-projecting shafts pivotally connected to said beam, the forward shafts being provided with alternating series of serrated-edged disks, and the rear shaft with rolls having circumferential grooves and ribs, as set forth.

4. In combination, beam A, shaft B, pivoted thereto and carrying rollers $b$, bearing eyebolts for adjustably supporting the said shaft at the beam, the cross-bar G, having depending arm at its outer end, and the bolt-bearing $f$ $f'$, loosely mounted in said arm, for the purpose set forth.

5. In a harrow, the combination of the main beam and the hinged extensions with the pivotally-connected shafts having the series of disks mounted thereon, as shown and described.

6. The combination of the main beam and the hinged extensions with the pivotally-connected shafts having the series of rollers or disks mounted thereon, as shown, and the slotted pivoted cross-bars, as described.

In testimony that I claim the foregoing as my own I affix my signature in presence of two witnesses.

JOHN D. SCHIBLI.

Witnesses:
O. E. DUFFY,
F. R. HARDING.